United States Patent
Albers et al.

[15] 3,699,165
[45] Oct. 17, 1972

[54] N,N-BIS[2-HYDROXYALKYL]-2-HYDROXYETHOXYACETAMIDE AND PROCESS FOR MAKING THE SAME

[72] Inventors: Kenneth H. Albers; Thomas C. Snapp, Jr., both of Longview, Tex.

[73] Assignee: Eastman Kodak Company, Rochester, N.Y.

[22] Filed: May 28, 1970

[21] Appl. No.: 41,576

[52] U.S. Cl. .............................. 260/561 B, 260/75
[51] Int. Cl. .................................... C07c 103/30
[58] Field of Search ............................ 260/561 B

[56] References Cited

UNITED STATES PATENTS 3,341,458  9/1967  Mayhew et al. ........ 260/561 B

Primary Examiner—Lewis Gotts
Assistant Examiner—Ethel G. Love
Attorney—Cecil D. Quillen, Jr. and Daniel B. Reece, III

[57] ABSTRACT

This invention relates to novel trioletheramides, i.e. N,N-bis[2-hydroxyalkyl]-2-hydroxyethoxyacetamide, having the formula

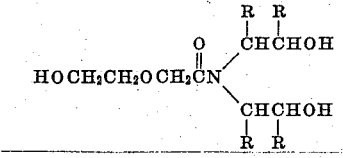

wherein each R is a member selected from the group consisting of hydrogen, methyl, and ethyl, and to a method of preparing said trioletheramides from 2-p-dioxanone and a non-heterocyclic secondary amine, preferably at a temperature of less than 60° C.

12 Claims, No Drawings

N,N-BIS[2-HYDROXYALKYL]-2-HYDROXYETHOXYACETAMIDE AND PROCESS FOR MAKING THE SAME

The present invention relates to trioletheramides unexpectedly exhibiting infinite water solubility at room temperature, and to a method of preparing said trioletheramides from 2-p-dioxanone and a secondary amine.

The reaction of 2-p-dioxanone with a primary amine is generally known. For example, U.S. Pat. No. 3,051,751, issued Aug. 28, 1962, discloses a reaction mixture of 2-p-dioxanone with primary amine groups in the presence of non-heterocyclic amine groups of higher order at temperatures below about 60° C. to form N-substituted-β-hydroxyethoxyacetamides. The same patent also specifically points out that the temperature of this reaction mixture should not exceed about 60° C. since at temperatures above this level the 2-p-dioxanone is capable of entering into reactions with secondary amine groups. Since a principle object of the invention disclosed in U.S. Pat. No. 3,051,751 is a selective reaction of 2-p-dioxanone with primary amine groups, it is clear that 2-p-dioxanone was heretofore regarded as incapable of reacting with non-heterocyclic secondary amines at temperatures below about 60° C.

Another patent showing the reaction of 2-p-dioxanone and a primary amine is U.S. Pat. No. 3,092,630, issued June 4, 1963. This patent discloses a method for the preparation of N-substituted-3-morpholones by reacting a primary or aromatic amine with 2-p-dioxanone at a temperature of from about 250° C. to about 350° C.

In addition to the art noted above, U.S. Pat. No. 3,341,458, issued Dec. 12, 1967, discloses the reaction of 2-p-dioxanone with several secondary amines at temperatures of from about 75° C. to about 175° C. thereby yielding a N-substituted amide of hydroxyethoxyacetic acid selected from the group comprising:

I.
$$RCNR_1NCCH_2OCH_2CH_2OH$$
$$\overset{\parallel}{O}\ \overset{|}{H}\ \overset{|}{R_1OH}\ \overset{\parallel}{O}$$

II.
$$RNR_1NCCH_2OCH_2CH_2OH$$
$$\overset{|}{H}\ \overset{|}{H}\ \overset{\parallel}{O}$$

III.
$$RN-R_1NCCH_2OCH_2CH_2OH$$
$$\overset{|}{C-CH_2OCH_2CH_2OH}$$
$$\overset{\parallel}{O}$$

wherein R is a hydrocarbon radical containing from about eight to about 21 carbon atoms; and $R_1$ is a lower alkylene radical.

An examination of the art noted hereinabove makes it clear that heretofore 2-p-dioxanone was not recognized as capable of reacting with any secondary non-heterocyclic amine, such as diethanolamine, at temperatures below about 60° C.

Thus, it is an object of the present invention to provide a novel method for making trioletheramides at a reaction temperature of less than about 60° C.

It is also an object of the present invention to prepare novel trioletheramides from the reaction of 2-p-dioxanone and a non-heterocyclic secondary amine, such as diethanolamine, preferably at a temperature of less than about 60° C.

It is a further object of the present invention to produce trioletheramides unexpectedly possessing the property of infinite water solubility at room temperature.

These and other objects and advantages of the present invention will become more clearly apparent from the following description.

According to the present invention there is provided novel compounds, new trioletheramides, namely, N,N-bis[2-hydroxyalkyl]-2-hydroxyethoxyacetamide having the following formula:

IV.
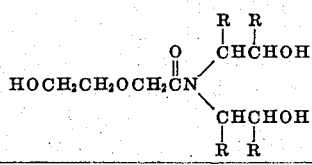

wherein each R is a member selected from the group consisting of hydrogen, methyl and ethyl. Also, there has been discovered a process for making said trioletheramides which comprises contacting 2-p-dioxanone and a non-heterocyclic secondary amine having a structural formula

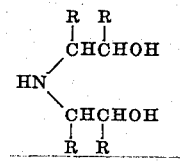

wherein each R is a member selected from the group consisting of hydrogen, methyl and ethyl, in a liquid media at a temperature within the range of from about 0° to about 60° C., preferably at a temperature of from about 15° C. to about 45° C. in order to obtain a substantially colorless product.

The reaction equation for the present invention may be illustrated as follows:

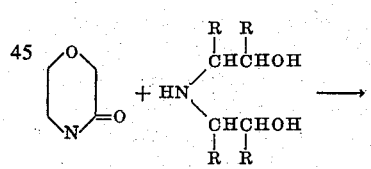

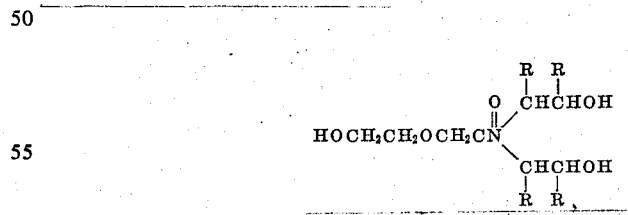

wherein each R is a member selected from the group consisting of hydrogen, methyl and ethyl.

Several unobvious and unexpected advantages of the present invention are especially noteworthy. First, as suggested hereinabove, the preferred temperature range at which the reaction of 2-p-dioxanone and a non-heterocyclic secondary amine such as, for example, diethanolamine takes place according to the instant invention, i.e. at a temperature below about 60° C., is clearly unexpected in view of the prior art teachings discussed above, e.g. U.S. Pat. No. 3,051,751 which teaches that the reaction of a non-heterocyclic secondary amine (e.g. diethanolamine) and 2-p-dioxanone does not take place below 60° C. Another unexpected feature of the present invention relates to the solvent properties of N,N-bis[2-hydroxyalkyl]-2-hydroxyethoxyacetamide. That is, these compounds, which have a molecular weight of about 207 to about 309, are found to be infinitely water soluble at room temperature. This is quite unexpected in view of other known triols having a similar molecular weight, i.e. within a range of from 190 to 218 or more, but which exhibit very limited solubility even in boiling water. See Chemical Abstracts, 51, 15403a, (1957).

The excellent water solubility properties of the trioletheramides of the instant invention makes these particular triols ideally suited for use as the trihydric alcohol component of alkyd resins. That is, in the preparation of certain known alkyd resins, i.e. polyesters prepared by the reaction of a suitable polyhydric alcohol and a polybasic carboxylic acid, the polyhydric alcohol component is commonly selected from alcohols such as glycerine, trimethylolpropane, and pentaerythritol. Such alkyd resins are generally suitable for forming baked coatings without the addition of curing agents. Baked coatings of these alkyd resins may be utilized as protective surface coatings and exhibit many desirable properties such as solvent and weather resistance, hardness, flexibility and gloss. However, the solvents and baking conditions required for processing these known alkyd resins into useful surface coating compositions have not been entirely satisfactory. Under the usual conditions, hydrocarbons, ketones, and/or alcohols are used as solvents, and baking temperatures of approximately 400° F. are required for these known resins. Clearly, alkyd resins capable of being processed into surface coating materials using lower baking temperatures and aqueous solvents would substantially reduce the danger of fire, aid in solvent recovery, decrease eye-irritating air-pollution, reduce the necessary protective insulation on the application equipment, reduce the temperature effects on the material to be coated, etc. Water, of course, is the preferred solvent for these alkyd resins because it is inexpensive and safe. Accordingly, in view of the excellent water solubility of the triol products of the instant invention, namely, N,N-bis[2-hydroxyalkyl]-2-hydroxyethoxyacetamide, these compounds have been found to provide an excellent polyhydric alcohol for the synthesis of water-soluble, alcohol-soluble alkyd resins suitable for forming coating compositions which bake at less than about 350° F. and which provide excellent protective coatings for metal and other substrates.

The process of preparing the trioletheramides of the instant invention is advantageously carried out by the addition of an equal molar quantity, or slight excess, of 2-p-dioxanone for each secondary amine group to be reacted. In a typical preparation of the trioletheramides of the present invention 1.00 mole of 2-p-dioxanone is added drop-wise to 1.00 mole of secondary amine. If it is desirable to assure that all the amine has reacted then an excess of lactone may be added to the reaction. The reaction may be run with or without an additional inert solvent or other inert liquid dispersing media. If such materials are utilized, an inert solvent is preferred such as pyridine, benzene, diethyl ether, chloroform, ligroine, etc. The reaction is preferably run at a temperature in the range of from about 15° C. to about 60° C., especially 28° C. to 60° C. To maintain this preferred temperature, external cooling is utilized. Although higher temperatures of up to about 120° C. may be used, the lower temperatures within the 15° C. to 60° C. range stated above are preferred in order to obtain substantially colorless products. Using the higher reaction temperatures leads to a yield of progressively darker colored products as demonstrated in the examples hereinbelow. Lower temperatures down to about 0° C. may also be used although it is generally more economical to utilize a temperature within the preferred range of from about 15° C. to about 60° C.

Advantageously, the reaction process of the present invention is carried out at atmospheric pressure. However, it will be recognized by those of ordinary skill in the art that rather significant deviations from atmospheric pressure could be utilized in the present process. However, for most practical purposes, those advantages which might be obtained using a significantly higher or lower pressure than atmospheric pressure are generally outweighed by the additional cost required therefore.

With respect to the utilization of an additional inert solvent or other inert liquid dispersing media in the process of the present invention, it will be demonstrated in the examples hereinbelow that the present reaction may be run with or without such materials. For example, if the process is run at a temperature equal to or above the melting point of the 2-p-dioxanone and/or the secondary amine, no additional liquid media is needed. Often, an inert liquid dispersing media may be useful to effect better distribution of the reactants and greater contact between the reactants. However, it is not required in the present process.

With respect to other preferred embodiments of the present invention, it should be noted that once having obtained the novel trioletheramides through the process of the present invention it has been found advantageous, for purposes of storing these products, to add trace amounts of sodium boro-hydride or other antioxidants to hinder color formation during storage.

The invention can further be illustrated by the following examples as preferred embodiments thereof which are not intended to limit the scope of the invention unless otherwise specifically indicated.

EXAMPLE 1

This example demonstrates the process of the present invention used to produce a novel trioletheramide of the invention. In this example a 1-liter, four-neck round bottom flask is fitted with a mechanical stirrer, a nitrogen gas dispersion tube, a thermometer, and a pressure-equalizing dropping funnel. The flask is charged with 467.8 grams of diethanolamine (i.e. 4.45 moles), and the funnel is charged with 469.6 grams of freshly distilled 2-p-dioxanone (i.e. 4.61 moles). The flask and the funnel are heated to approximately 28° C. to melt the two compounds. 2-p-Dioxanone is added drop-wise through the pressure equalizing dropping funnel with stirring during a period of about 3 hours. External cooling is used to limit the reaction temperature to 40° C. Stirring is continued an additional three hours as the reaction flask slowly cools to room temperature. 937.4 grams of N,N-bis[2-hydroxyethyl]-2-hydroxyethoxyacetamide product is obtained.

The product appears as a viscous water-clear liquid which solidifies upon standing. An infrared absorption analysis and other methods of chemical analysis are used to clearly identify the product as the novel trioletheramide of the present invention.

EXAMPLE 2

This example demonstrates that the process of the present invention may be run at low temperatures in solution. In this example, a reaction apparatus identical to that in Example 1 above is used. 128 grams of diethanolamine and 200 ml. of diethyl ether solvent are charged into the reaction flask. The solution is cooled to about 15° C. with rapid stirring. 132 grams of 2-p-dioxanone is added during a one hour period through the pressure-equalizing dropping funnel. External cooling is used to limit the reaction temperature to 20° C. Stirring is continued an additional nine hours. 260 grams of product is obtained. An infrared absorption analysis of the product shows the material to be the N,N-bis[2-hydroxyethyl]-2-hydroxyethoxyacetamide of the present invention.

EXAMPLE 3

This example demonstrates that the reaction may be run at a low temperature without a solvent. Again, a reaction apparatus identical to that disclosed in Example 1 hereinabove is utilized. In this example 393 grams of diethanolamine is heated to 40° C., and approximately 10 grams of 2-p-dioxanone is added with stirring. The solution is cooled to about 15° C. with stirring and the rest of the 2-p-dioxanone (i.e. 380 grams) is added during a period of three hours. External cooling is used to limit the reaction temperature to 25° C. or slightly less. Stirring is continued an additional two hours. 773 grams of the product is obtained. Infrared absorption analysis shows the product to be N,N-bis[2-hydroxyethyl]-2-hydroxyethoxyacetamide.

EXAMPLE 4

This example demonstrates that the reaction may be run at higher than the optimum temperature, i.e. higher than about 60° C., but that inferior, dark colored products will be obtained. Again, a reaction apparatus identical to that described in Example 1 hereinabove is used. In this example, 411 grams of diethanolamine is placed in the reaction flask. 435 grams of freshly distilled 2-p-dioxanone is added during a period of one hour. The reaction temperature is observed to rise to about 90° C. during the course of the addition. Stirring is continued an additional two hours. 846 grams of a rather dark colored product is obtained. Infrared absorption analysis shows the product to be N,N-bis[2-hydroxyethyl]-2-hydroxyethoxyacetamide.

EXAMPLE 5

This example demonstrates the process of the present invention used to produce novel trioletheramides of the invention. In this example 2-p-dioxanone is reacted with diisopropanolamine to produce the dimethyl homolog [$\beta$-substitution] of the compound synthesized in Example 1. Again, a reaction apparatus identical to that disclosed in Example 1 hereinabove is utilized. In this example 266 grams of diisopropanolamine is heated to 40° C. and 205 grams of 2-p-dioxanone is added during a 2 hour period through the pressure-equalizing dropping funnel. External cooling is used to limit the reaction temperature to 45° C. Stirring is continued an additional 14 hours. 471 grams of a viscous water-white material is obtained. An infrared absorption analysis of the product shows the material to be the desired trioletheramide of the present invention. Titration shows that less than 0.3 percent of the amine remains unreacted.

EXAMPLE 6

This example demonstrates the process of the present invention used to produce novel trioletheramides of the invention. In this example 2-p-dioxanone is reacted with di[3-hydroxy-2-butyl]amine to produce the tetramethyl homolog [$\alpha$- and $\beta$-substitution] of the compound synthesized in Example 1. Again, a reaction apparatus identical to that disclosed in Example 1 hereinabove is utilized. In this example 322 grams of di[3-hydroxy-2-butyl]amine is dissolved in 500 ml. of chloroform and is heated to 55° C., 205 grams of 2-p-dioxanone is added during four hours through the pressure-equalizing dropping funnel. Stirring is continued at 55° C. an additional 17 hours. Evaporation of solvent produced 527 grams of the desired trioletheramide. An infrared absorption analysis of the product shows the material to be the desired amide. Titration shows that less than 0.5 percent of the amine remains unreacted.

EXAMPLE 7

This example demonstrates the process of the present invention used to produce novel trioletheramides of the invention. In this example 2-p-dioxanone is reacted with di[3-hydroxy-2-propyl]amine to produce the dimethyl homolog [$\alpha$-substitution] of the compound synthesized in Example 1. Again, a reaction apparatus identical to that disclosed in Example 1 hereinabove is utilized. In this example 266 grams of di[3-hydroxy-2-propyl]amine is stirred at room temperature and 206 grams of 2-p-dioxanone is added during a 3 hour period. External cooling is used to limit the reaction temperature to 40° C. Stirring is continued an additional 19 hours. 472 grams of product is obtained. An infrared absorption analysis of the product shows the material to be the desired trioletheramide of the present invention. Titration shows that less than 0.4 percent of the amine remains unreacted.

EXAMPLE 8

This example demonstrates the process of the present invention used to produce novel trioletheramides of the invention. In this example 2-p-dioxanone is reacted with [2-hydroxy-1-butyl]-[3-hydroxy-2-propyl]amine to produce the methyl-ethyl homolog [$\alpha$- and $\beta$-substitution] of the compound synthesized in Example 1. Again, a reaction apparatus identical to that disclosed in Example 1 hereinabove is utilized. In this example 292 grams of [2-hydroxy-1-butyl]-[3-hydroxy-2-propyl] amine is heated to 30° C. with stirring and 204 grams of 2-p-dioxanone is added during two hours.

External cooling is used to limit the reaction temperature to 40° C. Stirring is continued an additional 15 hours. 496 grams of product is obtained. An infrared absorption analysis of the product shows the material to be the desired trioletheramide of the present invention. Titration shows that less than 0.2 percent of the amine remains unreacted.

EXAMPLES 9 THROUGH 14

These examples demonstrate the process of the present invention used to product various novel trioletheramides of the invention. In these examples 2-p-dioxanone is reacted with the secondary amines listed in Table I to produce the listed trioletheramides. A reaction apparatus identical to that disclosed in Example 1 hereinabove is utilized. In these examples 266 grams of the secondary amine is heated to 40° C. and 205 grams of 2-p-dioxanone is added during a two hour period through the pressure-equalizing dropping funnel. External cooling is used to limit the reaction temperature to 45° C. Stirring is continued an additional 14 hours. Approximately 471 grams of a viscous water-white material is obtained. An infrared absorption analysis of the product shows the material to be the desired trioletheramides listed in Table I.

TABLE I

| Ex. No. | Secondary amine | Trioletheramide |
|---|---|---|
| 9 | HN(CH₂CHOHCH₃)(CH₂CH₂OH) | HOCH₂CH₂OCH₂C(O)N(CH₂CHOHCH₃)(CH₂CH₂OH) |
| 10 | HN(CHCH₂OH·CH₃)(CH₂CH₂OH) | HOCH₂CH₂OCH₂C(O)N(CHCH₂OH·CH₃)(CHCH₂OH) |
| 11 | HN(CHCH₂OH·CH₃)(CH₂CHOH·CH₃) | HOCH₂CH₂OCH₂C(O)N(CHCH₂OH·CH₃)(CH₂CHOH·CH₃) |
| 12 | HN(CHCH₂OH·C₂H₅)(CH₂CH₂OH) | HOCH₂CH₂OCH₂C(O)N(CHCH₂OH·C₂H₅)(CH₂CH₂OH) |
| 13 | HN(CH₂CHOH·CH₃)(CH₂CHOH·C₂H₅) | HOCH₂CH₂OCH₂C(O)N(CH₂CHOH·CH₃)(CH₂CHOH·C₂H₅) |
| 14 | HN(CH₂CHOH·CH₃)(CH₂CHOH·CH₃) | HOCH₂CH₂OCH₂C(O)N(CH₂CHOH·CH₃)(CH₂CHOH·CH₃) |

The invention has been described in considerable detail with particular reference to certain preferred embodiments thereof, but it will be understood that variations and modifications can be effected within the spirit and scope of the invention as described hereinabove, and as defined in the appended claims.

We claim:

1. The compounds having the structural formula

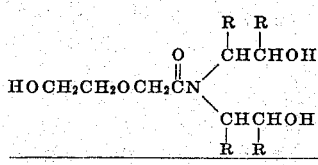

wherein each R is a member selected from the group consisting of hydrogen, methyl and ethyl.

2. A process for making the compound represented by the structural formula of Claim 1 which comprises contacting 2-p-dioxanone and a secondary amine having the structural formula

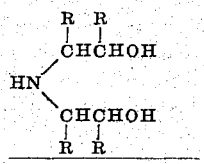

wherein each R is a member selected from the group consisting of hydrogen, methyl and ethyl, in a liquid media at a temperature within the range of from about 0° to about 60° C.

3. A process according to claim 2 wherein said reaction is carried out at a temperature less than about 45° C. thereby obtaining a substantially colorless product.

4. A process according to claim 2 wherein said reaction is carried out in an inert solvent.

5. A process according to claim 4 wherein said reaction is carried out at a temperature within the range of from about 15° C to about 45° C.

6. A process according to claim 2 wherein the secondary amine is diethanolamine.

7. A process for making N,N-bis[2-hydroxyethyl]-2-hydroxyethoxyacetamide which comprises reacting together 2-p-dioxanone and diethanolamine in a molar ratio of about 1.0 mole of 2-p-dioxanone for each 1.0 moles of diethanolamine, said reaction carried out at a temperature within the range of from about 28° C. to about 60° C.

8. A compound as in claim 1 having the structural formula

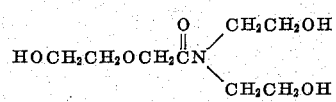

and being identified as N,N-bis[2-hydroxyethyl]-2-hydroxyethoxyacetamide.

9. A compound as in claim 1 having the structural formula

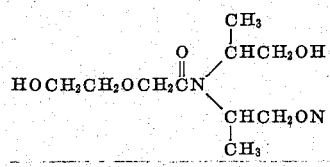

and being identified as N,N-bis-[1-hydroxy-2-propyl]-2-hydroxyethoxyacetamide.

10. A compound as in claim 1 having the structural formula

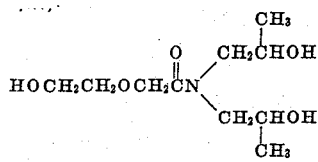
and being identified as N,N-bis-[2-hydroxy-1-propyl]-2-hydroxy ethoxyacetamide.
11. A compound as in claim 1 having the structural formula
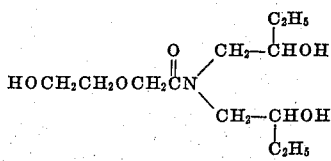
and being identified as N,N-bis-[2-hydroxy-1-butyl]-2-hydroxyethoxyacetamide.
12. A compound as in claim 1 having the structural formula
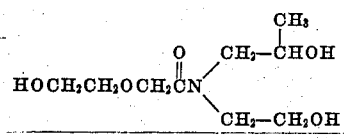
and being identified as N,N-[2-hydroxy-1-propyl]-[2-hydroxyethyl]-2-hydroxyethoxyacetamide.
* * * * *